United States Patent [19]

Kitsugi

[11] 4,210,165
[45] Jul. 1, 1980

[54] PRESSURE REGULATING EQUIPMENT FOR AIR CUSHION

[75] Inventor: Kentaro Kitsugi, Kasukabe, Japan

[73] Assignee: Tokyo Automatic Control Kabushiki Kaisha, Tokyo, Japan

[21] Appl. No.: 897,847

[22] Filed: Apr. 19, 1978

[30] Foreign Application Priority Data

Apr. 20, 1977 [JP] Japan ................................. 52-48874

[51] Int. Cl.² .......................................... G05D 16/06
[52] U.S. Cl. ..................................... 137/102; 91/433; 267/119
[58] Field of Search ......................... 91/433; 137/102; 267/65 D, 119, 126, 130

[56] References Cited

U.S. PATENT DOCUMENTS

| | | | |
|---|---|---|---|
| 2,939,431 | 6/1960 | Bottje | 91/433 |
| 3,298,384 | 1/1967 | Payne | 137/102 |
| 3,311,027 | 3/1967 | Kindlimann | 91/433 X |

*Primary Examiner*—Robert G. Nilson
*Attorney, Agent, or Firm*—Oblon, Fisher, Spivak, McClelland & Maier

[57] ABSTRACT

Pressure regulating equipment for an air cushion, which has a check valve, an outlet of which is connected with a large capacity air cushion such as a balancer, diecushion, etc. of a press. It also includes a pilot operated pressure regulator, an inlet of which is connected with the downstream side of said check valve and the pressure of the downstream side of which is regulated to the same pressure as the pilot air, a pilot pressure regulator giving pilot air to a pilot air receiving port of said pilot operated pressure regulator, a three way valve from which air is discharged by the pilot air and which is connected between the downstream side of said check valve and said air cushion, and a differential pressure operating valve which opens a passage from the upstream side of said pilot operated pressure regulator to a pilot air receiving port of said three way valve by differential pressure between the pilot air from said pilot pressure regulator and air pressure existing in a line between said check valve and said pilot operated pressure regulator.

5 Claims, 5 Drawing Figures

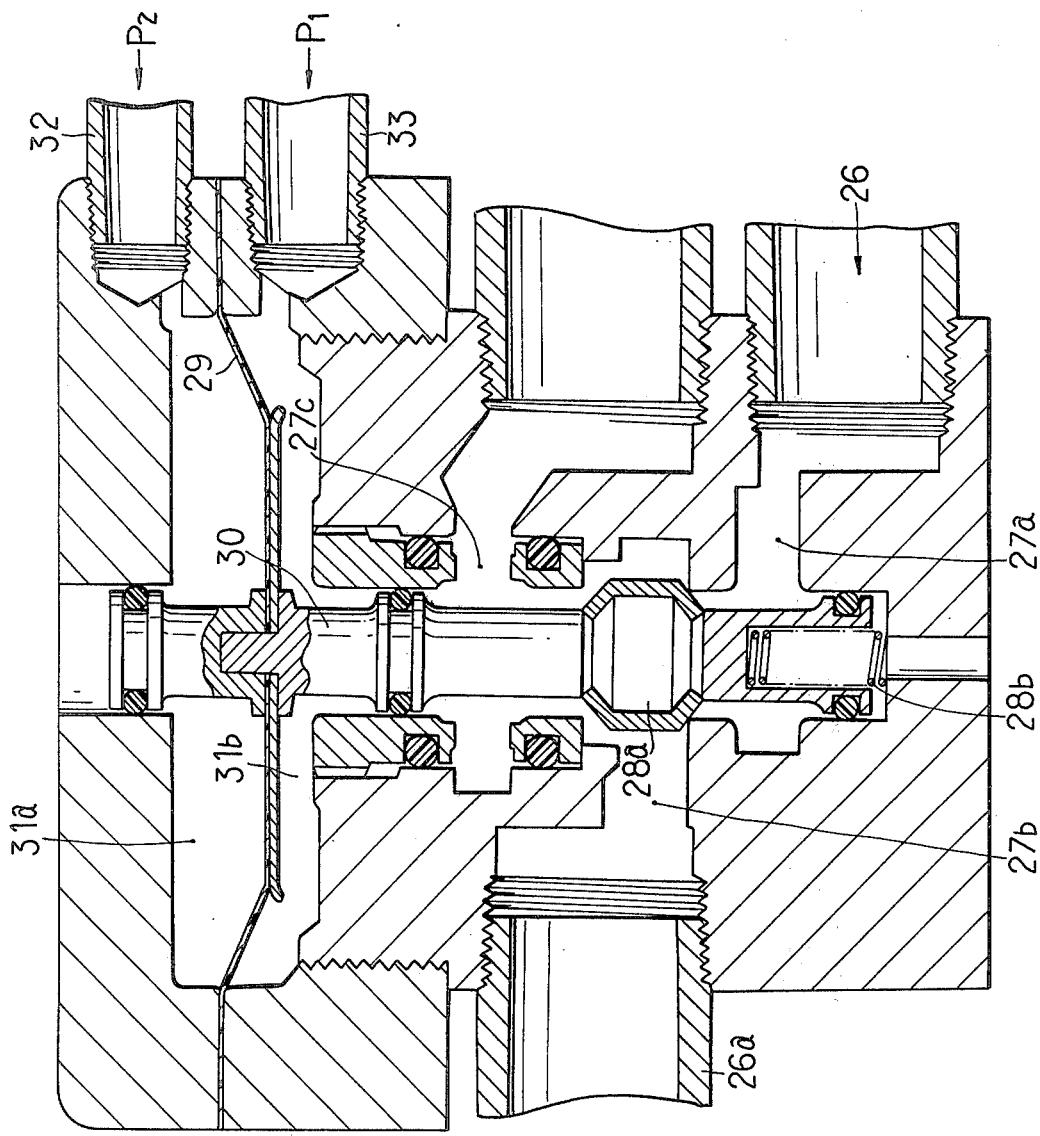

PRESSURE REGULATING EQUIPMENT FOR AIR CUSHION

BACKGROUND OF THE INVENTION

The present invention relates to an improvement of pressure regulating equipment for an air cushion such as a balancer, diecushion, etc. of a press.

A balancer or a diecushion of a press generally has a large capacity reservoir storing compressed air regulated to suitable pressure, which is placed in a compressed air supply line so as to better provide a cushion effect against a shock.

The pressure regulating equipment for an air cushion of press shown in FIG. 1 was used in the past. It consisted of a pressure regulator 2, a check valve 4 with a manual override shut-off handle 3, a three way valve 5, an air reservoir 6 and a cushion cylinder 7 connected with compressed air supply lines 1 in this order.

The pressure regulator 2 used in a conventional press is constructed shown in FIG. 2, in which a valve 9b is opened or closed the by balance of force between a spring 9a pressing a diaphragm 8 downwards and air pressure of the downstream side forcing the diaphragm 8 upwards. This conventional equipment will take a long time to reach a set air pressure, as the higher the pressure of the downstream side becomes as it draws near the set pressure, opening of the valve becomes, which interrupts flowing air therethrough. It, therefore, takes as long as twenty minutes in the case of a large capacity press.

Furthermore, when the air cushion is reset to a lower pressure than the air pressure already filled up, the manual override shut-off handle 3 of the check valve 4 should be closed in order to stop flowing air into a free flowing direction, and the pressure regulator 2 should be reset to a desired pressure. Then the three way valve 5 is opened to discharge the air in the reservoir 6 until it gets a lower pressure than set pressure. The three way valve 5 is closed and the manual override handle of check valve 3 is released so that the check valve 4 works again. In this way, the pressure in the air cushion is regulated to the set pressure by pressure regulator 2. It, therefore, needs many operations to control it, which is very troublesome and takes a long time to obtain the desired pressure.

SUMMARY OF THE INVENTION

An object of this invention is to provide easily adjustable pressure regulating equipment for a large capacity air cushion such as a balance, diecushion, etc. of a press.

Another object of the present invention is to provide pressure regulating equipment for a large capacity air cushion such as a balancer, diecushion, etc. of a press, which is able to fill up air in a very short time until it gets to the set pressure, and being able to save many operations so that one operation is enough to regulate pressure in the air cushion circuit to set the pressure when it is reset to lower pressure than the filled up pressure in the air cushion, and being able to get the same pressure as the set pressure without waiting for the air cushion to be refilled up.

BRIEF DESCRIPTION OF THE DRAWINGS

FIG. 5 is a cross-sectional view of a differential pressure operating valve.

PREFERRED EMBODIMENT OF THE INVENTION

A detailed description of the invention is shown in the FIGS. The equivalent parts to conventional parts are expressed in the same figures.

Figure 1:
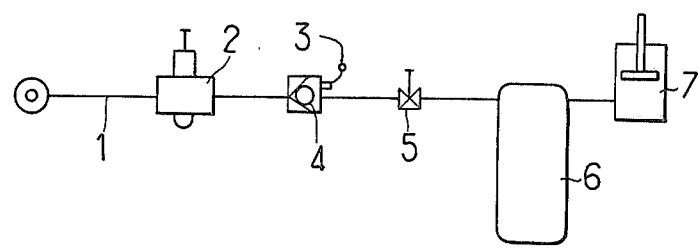
FIG. 1 is a schematic air circuit diagram showing a conventional equipment.
Figure 2:
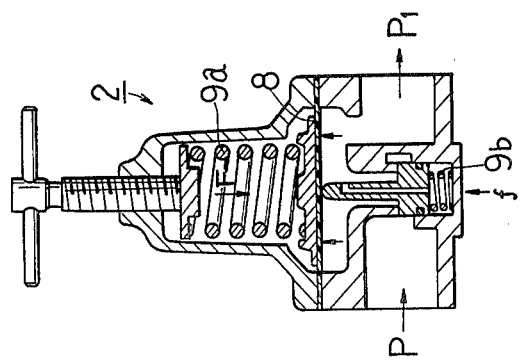
FIG. 2 is a cross-sectional view of a pressure regulator used in conventional equipment.

In the FIGS., 10 is a pilot pressure operated regulator connected with a compressed air supply line 1. In the downstream side of said pilot operated pressure regulator 10, a check valve 4, an air reservoir 6 and a cushion cylinder 7 are connected with air supply line 1 in this order, which is the same as the conventional equipment as shown in FIGS. 1 and 2.

Figure 4:
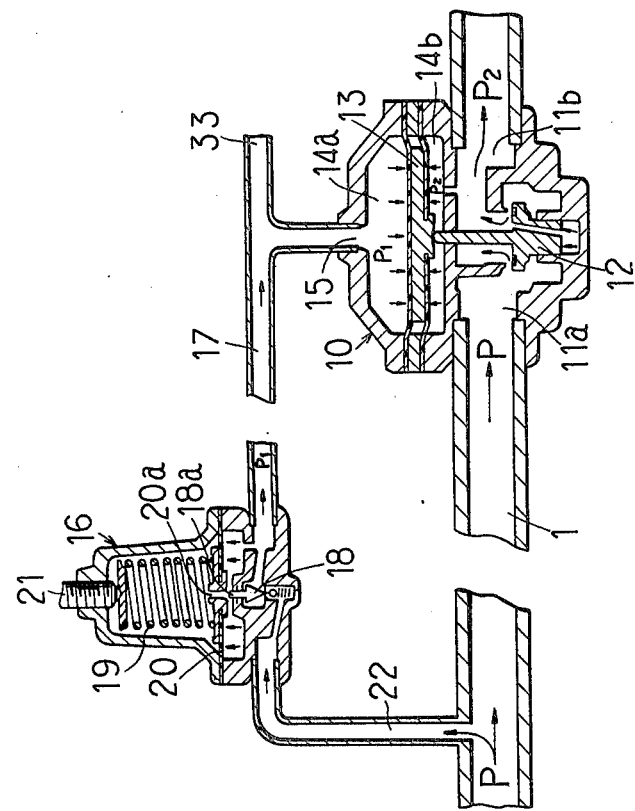
FIGS. 4 are cross-sectional views showing a pilot operated pressure regulator and a pilot pressure regulator of the embodiment.

In FIG. 4, the pilot operated pressure regulator 10 has built therein a valve 12 which will open or close between primary flow passage 11a and a secondary flow passage 11b connected with the air supply line 1. The valve 12 is controlled by a diaphragm 13, dividing an upper chamber 14a and a lower chamber 14b. The lower chamber 14b has the secondary flow passage 11b and the upper chamber 14a has the primary flow passage 11a. When pressure in the upper chamber is higher than pressure in the lower chamber 14b, the diaphragm 13 goes down to push the valve 12 down, which makes the valve open.

That is, the set pressure in the upper chamber 14a is represented by P1, the pressure in the lower chamber 14b is represented by P2, and the pressed area of the diaphragm is represented by S1. Then when the formula $P1 : S1 = P2 : S1$ is met, it is balanced. And when P2 is even slightly lower than P1, the valve 12 is pushed down by force, $(P1-P2) : S1$ to open fully the flow passage between the primary flow passage 11a and the secondary flow passage 11b. And when P2 is even slightly higher than P1, it is fully closed.

Pilot air regulated to a set pressure is provided to a pilot air receiving port 15 of the pilot operated pressure regulator 10 from a pilot pressure regulator 16 through a pilot air piping 17.

The pilot pressure regulator 16 has a valve 18, a spring 19, a diaphragm 20 and an adjusting screw 21. The valve 18 is controlled by the diaphragm 20 which is controlled by the balance of force between the spring 19 and air pressure in the downstream side of the pilot pressure regulator 16. And the adjusting screw 21 provides a method of applying a load to the spring 19 to control the pressure of air within the pilot air piping 17.

The diaphragm 20 has a relieving passage 20a which can be opened or closed with a needle 18a of the valve 18. Therefore, lowering the pressure of the spring 19 to a lower than setting pressure by loosing the adjusting screw 21 will discharge the compressed air in the downstream side as the relieving passage 20a is freed from the needle 18a.

The upstream side of the pilot pressure regulator 16 is connected with the upstream side of the pilot operated pressure regulator 10 through a branch 22.

The three way valve 24 is connected with the check valve 4 and the air reservoir 6. The pilot air opens the passage between the inlet and the outlet of the three way valve 24. Discharging the pilot air turns off the passage between the inlet and the outlet by a spring and also turns the outlet on to the open air.

A pilot air receiving port 24a is connected with an air supply passage 26 connected with the compressed air supply line 1 of the upstream side of the pilot operated pressure regulator 10, through a differential pressure operating valve 25.

As shown in FIG. 5, pushing down a valve 28a closes the passage between an inlet air passage 27a connected with the air supply passage 26 and an outlet air passage 27b connected with an air passage, and also opens the passage between the outlet air passage 27b and a discharging outlet 27c. Pulling up the valve 28a opens the passage between the inlet air passage 27a and the outlet air passage 27b, and also closes the passage between the outlet air passage 27b and the discharging outlet 27c.

The valve 18a is pushed down by the diaphragm 29 when air pressure in an upper chamber 31a is higher than air pressure in a lower chamber 31b and the force of a spring 28b. The valve 28a is pulled up by the diaphragm 29 with a valve stem 30 when the air pressure in the upper air chamber 31a is the same strength as the air pressure in the lower air chamber 31b, because the spring 28b pushes the valve 28a up.

Figure 3:
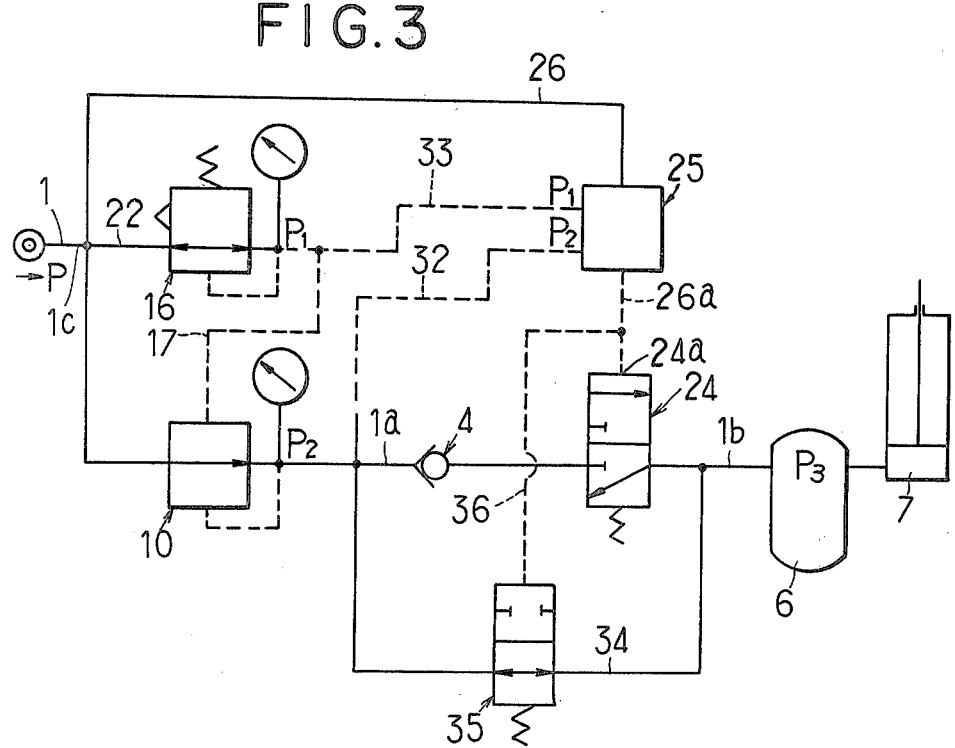
FIG. 3 is a schematic air circuit diagram of an embodiment of the pressure regulating equipment of the present invention.

As shown in FIG. 3, the upper air chamber 31a is connected with an air passage 32 connected with the line 1a between the downstream side of the pilot air operated pressure regulator 10 and the check valve 4. And the lower air chamber 31b is connected with an air passage 33 which is connected with the secondary of the pilot pressure regulator 16.

A two way valve 35 is connected with bypass air passages 34 between the line 1a connecting with the downstream side of the pilot air operated pressure regulator 10 and the check valve 4 and the line 1b connecting the three way valve 24 and the air reservoir 6. The two way valve 35 is turned on by its built-in spring. And it will usually be closed by pilot air. The pilot air flows from a pilot air inlet of the two way valve 35 through an air passage 36 connecting with a pilot air passage between the differential pressure operating valve 25 and the three way valve 24. Therefore, the two way valve 35 is closed when the pilot air flows from the differential pressure operating valve 25 to the two way valve 35 and the three way valve 24.

The pressure regulating equipment for air cushioning works as following.

The air pressure in the line of the upstream side of this equipment is represented by P. The pressure in the secondary flow passage 11b of the pilot operated pressure regulator 10 is represented by P2. The set pressure of the secondary of the pilot pressure regulator is represented by P1. And the pressure in the air reservoir 6 and cushion cylinder 7 is represented by P3. Then, the formula is $P3=P2<P1<P$ exists when the pressure P3 in the air reservoir 6 and the cushion cylinder 7 is lower than a set pressure by this pressure regulating equipment. The valve 28a will be, therefore, pulled up as the pressure in the upper air chamber is P1. So the inlet air passage 27a will communicate with the outlet air passage. And the three way valve 24 will open the passage between the check valve 4 and the air reservoir 6. While the two way valve will close the bypass 34 between the line 1a and the line 1b.

And the pilot operated pressure regulator 10 will keep being open as $P1>P2$. The compressed air will, therefore, flow into the air reservoir 6 and the cushion cylinder 7 until it becomes $P1=P3$. Then the regulator 10 will close when it becomes $P1=P2$.

In the case of resetting the pressure in the air reservoir 6 and the cushion cylinder 7 to a lower pressure when it is the above mentioned state, the following operation will be done.

Resetting the pilot pressure regulator 16 to a lower set pressure will separate the diaphragm 20 from the valve 18a. P1 will, therefore, lower to the set pressure. Then the diaphragm 29 of the differential pressure operating valve 25 will be pushed down to the lower chamber 31b as it is $P1<P2=P3$. So the valve 28a will close the passage between the inlet air passage 27a and the outlet air passage 27b, and the passage between the outlet air passage 27b and the discharging outlet 27c will be opened so as to discharge the air in the air passage 26a and in the air passage 36. Discharging the air in the air passage 26a will switch the passages of the three way valve 24, closing the passage of the check valve 4 side and opening the passage of the air reservoir 6 side to the open air. P3, therefore, lowers.

While the two way valve 35 will be opened by discharging the air in the passage 36, so that the air in the line 1a will be discharged from the three way valve 24 through the two way valve 35 and the bypass 34, which lowers the pressure P2 at the same time as P3 lowers. And when it becomes $P2=P1$ by the discharge, the valve 28a of the differential operating valve 25 is pushed up by the spring 28b through a valve stem 30, opening the passage between the input air passage 27a connected with the air supply passage 26 and the outlet air passage 27b connected with the air passage 26a, and closing the passage between the outlet air passage 27b and the discharging outlet 27c. Air which flows from the differential pressure operating valve 25 flows into the three way valve 24 and the two way valve 35 through the air supply passage 26a and the air passage 36, so that the three way valve 24 and the two way valve 35 are reset.

As mentioned in the above embodiment, the differential pressure operating valve 25 allows the pilot air to flow when $P1>P2$. That is, the pressure in the secondary flow passage 11b of the pilot operated pressure regulator 10 is lower than the pressure in the secondary of the pilot pressure regulator 16. The pilot air flows into the three way valve 24 and the two way valve 35 so as to open the passage in the three way valve 24 and to close the passage in the two way valve 35.

Another embodiment is one operating in the opposite way. That is; the differential pressure operating valve allows the pilot air to discharge when $P1>P2$. The pilot air discharges from the three way valve 24 and the two way valve 35 through the valve 25 so as to open the passage of the three way valve 24 and to close the two way valve 35.

What is claimed as new and desired to be secured by Letters Patent of the United States is:

1. Pressure regulating equipment for a large capacity air cushion, comprising:
   a pilot operated pressure regulator including a downstream side and a pilot air receiving port;
   a pilot pressure regulator being settable for a desired pilot pressure at its downstream side, said downstream side of said pilot pressure regulator being connected to said pilot air receiving port, said pilot operated pressure regulator being adapted to equalize the air pressure at said downstream side with the air pressure from said pilot pressure regulator at said pilot air receiving port;

a check valve, said check valve including an inlet connected to said downstream side of said pilot operated pressure regulator and an outlet;

a three way valve including a passage operable by an air pressure signal and connecting said outlet of said check valve with said air cushion; and a differential pressure operating valve having a first inlet communicating with said downstream side of said pilot operated pressure regulator and a second inlet communicating with said downstream side of said pilot pressure regulator, said differential pressure operating valve adapted to supply an air pressure signal at an outlet thereof by a pressure differential between said inlet ports, said outlet connected to said three way valve and said air pressure signal opening said passage.

2. Pressure regulating equipment for a large capacity air cushion as in claim 1 in which said pilot operated pressure regulator has a diaphragm, said diaphragm controlling the opening and closing of a valve positioned between an inlet passage and an outlet passage of said pilot operated pressure regulator, said diaphragm dividing an upper chamber and a lower chamber, said upper chamber connecting with said pilot air receiving port, and the lower chamber connecting said outlet passage.

3. Pressure regulator equipment for an air cushion as in claim 1 in which said pilot pressure regulator converts air pressure in that portion of said regulator connected with the upstream side of the pilot air operated pressure regulator into said set pressure, supplying said set pressure to the pilot air receiving port.

4. Pressure regulating equipment for an air cushion as in claim 1 or claim 3 in which said pilot pressure regulator has a valve, said valve opening and closing a passage between its inlet and its outlet, a diaphragm controlling said valve, a spring operating on said diaphragm, and an adjusting screw operating on said spring for adjusting the load pressure of said spring, one face of said diaphragm being pushed up by pressure in a chamber connected to an outlet flow passage of the regulator, and another face of said diaphragm being pushed down by the pressure of said spring.

5. Pressure regulating equipment for an air cushion as in claim 1 in which said differential pressure operating valve opens a passage between a third inlet and said outlet by excess pilot air pressure, and closes said passage and opens said outlet to the open air by a valve pushed up by a spring.

* * * * *